United States Patent Office 3,812,129
Patented May 21, 1974

3,812,129
PIPERAZINYL SUBSTITUTED ALKOXY
BENZOPHENONES
Albrecht Edenhofer, Riehen, Henri Ramuz, Birsfelden, and Hans Spiegelberg, Basel, Switzerland, assignors to Hoffmann-La Roche Inc., Nutley, N.J.
No Drawing. Application May 21, 1970, Ser. No. 39,505, now Patent No. 3,706,755, dated Dec. 19, 1972, which is a continuation-in-part of abandoned application Ser. No. 567,354, July 25, 1966. Divided and this application Apr. 19, 1972, Ser. No. 245,610
Claims priority, application Switzerland, July 30, 1965, 10,769/65
Int. Cl. C07d 51/70
U.S. Cl. 260—268 PH
8 Claims

ABSTRACT OF THE DISCLOSURE

Novel benzophenone derivatives bearing a piperazinyl substituted lower alkoxy group are disclosed together with processes for preparing these compounds. These novel benzophenones are useful as psychosedative agents.

Related Applications

This application is a divisional application of Ser. No. 39,505, filed May 21, 1970, and now U.S. Pat. 3,706,755 issued Dec. 19, 1972, which in turn is a continuation-in-part of Ser. No. 567,354, filed July 25, 1966 and now abandoned.

DESCRIPTION OF THE INVENTION

The present invention relates to novel products useful for pharmaceutical purposes, novel intermediates useful in the preparation of such novel products and to novel processes for preparing the foregoing.

More specifically, the invention relates to novel lower alkyloxy benzophenone derivatives useful for pharmaceutical purposes by virtue of their pharmacological activity, to novel processes for preparing the latter and to novel benzophenone intermediates useful in such processes.

The novel lower alkyloxy benzophenone derivatives useful as pharmaceutical agents are selected from the group conisisting of compounds of the formula

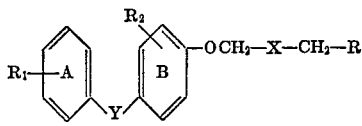

wherein R is selected from the group consisting of

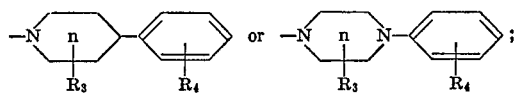

the character $n$ represents from 0–2 double bonds; $R_3$ is hydrogen or hydroxy; $R_4$ is hydrogen, lower alkyl, lower alkoxy, or halogen; $R_1$ and $R_2$ are each selected from the group consisting of hydrogen, lower alkyl, lower alkoxy, halogen, cyano, carboxy, nitro, amino and trifluoromethyl; Y is selected from the group consisting of carbonyl, methylene, hydroxymethylene and hydroxyiminomethylene; and X is selected from the group consisting of carbonyl, hydroxymethylene, acyloxymethylene, alkoxymethylene, alkoxycarbonyloxymethylene and dihydroxyphosphinylmethylene the pharmaceutically acceptable acid addition salts thereof, the quaternary salts thereof with quaternizing agents, the ketals thereof and optical isomers thereof.

Representatives of the compounds of Formula I above are:

4 - [3,6 - dihydro - 4-phenyl-1(2H)pyridyl)-2-hydroxypropoxy]-benzophenone.

4-[3-(3,6-dihydro - 4 - phenyl-1(2H)pyridyl)-2-hydroxypropoxy]-4'-chlorobenzophenone
4 - [3-(4-(p-chlorophenyl)-3,6-dihydro-1(2H)pyridyl)-2-hydroxy-propoxy]-benzophenone
4 - [3-(4-(p-chlorophenyl)-3,6-dihydro-1(2H)pyridyl)-2-hydroxy-propoxy]-4'-chlorobenzophenone
4 - [3 - (3,6 - dihydro-4-phenyl-1(2H)pyridyl)-2-hydroxypropoxy]-4'-fluorobenzophenone
4 - [3-(4 - (p - fluorophenyl)-3,6-dihydro-1(2H)pyridyl)-2-hydroxy-propoxy]-4'-fluorobenzophenone
4 - [3 - (p - fluorophenyl)-3,6-dihydro-1(2H)pyridyl)-2-hydroxy-propoxy]-4'-chlorobenzophenone
droxypropoxy-4'-fluorobenzophenone
propoxy]-4'-fluorobenzophenone.
4-[3-(4-(p-chlorophenyl) - 3,6-dihydro-1(2H)pyridyl)-2-hydroxy-propoxy]-4'-fluorobenzophenone
4-[3-(4-(p-fluorophenyl) - 3,6 - dihydro-1(2H)pyridyl)-2-hydroxy-propoxy]-4'-bromobenzophenone
4-[3-(4-(p-chlorophenyl) - 3,6 - dihydro-1(2H)pyridyl)-2-hydroxy-propoxy]-4'-bromobenzophenone
4 - [3 - (4 - (p - chlorophenyl)-1-piperazinyl)-2-hydroxypropoxy]-benzophenone
4 - [3 - (4 - (p - chlorophenyl)-1-piperazinyl)-2-hydroxypropoxy]-4'-fluorobenzophenone.

A preferred group of compounds falling within the scope of Formula I are those wherein $R_1$ is hydrogen or halogen and $R_2$ is hydrogen, i.e. a compound of the formula

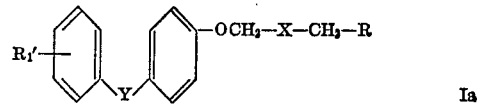

wherein $R_1'$ is hydrogen or halogen and X, Y and R are as described above.

Another preferred group of compounds falling within the scope of Formula I are those wherein Y signifies a carbonyl group, i.e. compounds of the formula

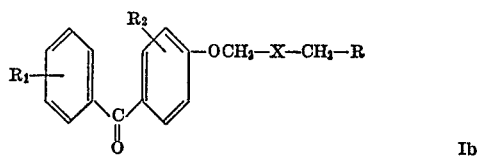

wherein R, $R_1$, $R_2$ and X are as described above.

A further preferred embodiment of the present invention are those compounds falling within the scope of Formula I wherein X signifies hydroxymethyl and Y signifies a carbonyl group, i.e. compounds of the formula

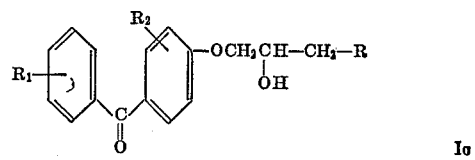

wherein R, $R_1$ and $R_2$ are as described above.

In another preferred aspect, $R_1$ is halogen, preferably chlorine or fluorine, and is joined at the 4-position of the benzophenone moiety, $R_2$ is hydrogen, X is hydroxymethyl, Y is carbonyl, and R is the group

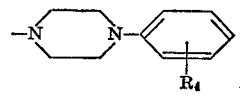

where $R_4$ is as described above.

Preferred are those compounds of the Formula I wherein X is hydroxymethylene and Y is carbonyl. Especially preferred are compounds as in the last sentence wherein $R_1$ is hydrogen or halogen, $R_2$ and $R_3$ are both hydrogen, and R₄ is hydrogen, halogen or lower alkoxy, i.e. compounds of the formula

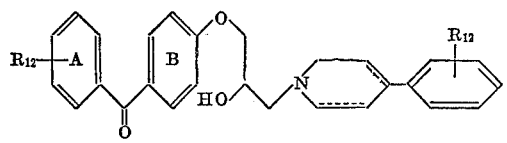

Id and

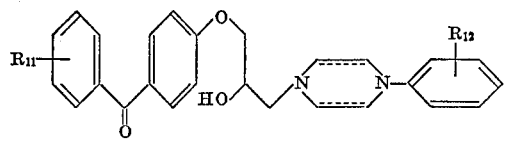

Ie wherein R₁₁ is selected from the group consisting of hydrogen and halogen; R₁₂ is hydrogen, halogen or lower alkoxy; and the dotted lines indicate the option of having none, one or two double bonds.

Most preferred of the compounds of Formula I are:
4-[3-(3,6-dihydro-4-phenyl-1(2H)-pyridyl)-2-hydroxy-propoxy]-benzophenone
4-[3-(4-(p-fluorophenyl)-3,6-dihydro-1(2H)-pyridyl)-2-hydroxypropoxy]-4'-chloro-benzophenone
4-[3-(4-(p-fluorophenyl)-3,6-dihydro-1(2H)-pyridyl)-2-hydroxypropoxy)-4'-fluoro-benzophenone
4-[3-(4-(p-chlorophenyl)-3,6-dihydro-1(2H)-pyridyl)-2-hydroxypropoxy]-4'-chloro-benzophenone
4-[3-(4-(p-methoxyphenyl)-1-piperazinyl)-2-hydroxy-propoxy]-4'-fluoro-benzophenone
4-[3-(4-(p-methoxyphenyl)-1-piperazinyl)-2-hydroxy-propoxy]-4'-chloro-benzophenone.

The term "lower alkyl" as utilized throughout the present disclosure is intended to designate straight or branched chain hydrocarbon groups having from 1–7 carbon atoms, most preferably, from 1–5 carbon atoms in the chain. Representative of such are methyl, ethyl, propyl, isopropyl, butyl and the like. The term "halogen" is intended to connote all 4 forms thereof, e.g. fluorine, chlorine, bromine and iodine unless otherwise specified. Especially preferred among the members of the halogen family for the purposes of the present invention are fluorine, chlorine and bromine, most advantageously, fluorine and chlorine. The term "lower alkoxy" as employed herein connotes a straight or branched hydrocarbonoxy chain containing 1–7 carbon atoms, preferably 1–5 carbon atoms, such as methoxy, ethoxy, isopropyloxy and the like. By the term "acyl" there is intended groupings bearing a terminal C=O grouping joined to a carbon atom, such as benzoyl and an acyl moiety of a lower alkanoic acid, e.g. acetyl, propionyl and the like.

As is evident from the above, when n is 0, i.e. wherein the heterocyclic moiety in the group designated by the character R contains no double bonds, i.e., is saturated, then piperidino or piperazinyl is intended. Similarly, if n is 1 or 2, i.e., the heterocyclic moiety contains one or two double bonds, there is represented dihydropyridinyl, tetrahydropyridinyl, dihydropyrazinyl, tetrahydropyrazinyl and substituted derivatives thereof. The introduction of the heterocyclic moiety may be effected by the utilization of an appropriate starting material containing the corresponding heterocyclic moiety. Alternatively, an unsaturated heterocyclic moiety, i.e. wherein n in the Formula I is 1 or 2, can be provided in the end product of Formula I above by the use of an appropriate starting material containing an unsaturated heterocyclic moiety and the so-formed compound containing such an unsaturated heterocyclic moiety can be reduced by hydrogenation in a manner more fully described hereinafter.

The novel compounds of the Formula I can be prepared using a wide variety of reaction routes. In one such preparative technique, a compound of the Formula I above is obtained by reacting a corresponding compound of the formula

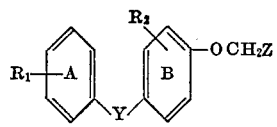

II wherein R₁, R₂ and Y are as described above and Z is selected from the group consisting of X'—CH₂—R₅ and

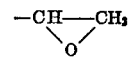

where X' represents a member selected from the group consisting of carbonyl or hydroxymethylene and R₅ is halogen, preferably chlorine or bromine, alkyl sulfonyloxy, preferably mesyloxy and aryl sulfonyloxy, preferably tosyloxy and ketals or diketals thereof with a compound of the formula

H—R    III wherein R is as described above.

In another reaction route leading to the compounds of Formula I above, a compound of the formula

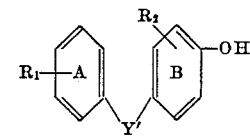

IV wherein R₁ and R₂ are as above and Y' is selected from the group consisting of carbonyl, methylene and hydroxymethylene or a ketal of this compound is reacted with a compound of the formula

M—CH₂—R    V wherein R is described above and M is selected from the group consisting of

and —X"CH₂R₅ where X" is carbonyl or hydroxymethylene and R₅ is as described above.

In another process aspect of the present invention, compounds of Formula I wherein Y is carbonyl, X is hydroxymethylene, R₁ is hydrogen or halogen, preferably chlorine or fluorine, R₂ is hydrogen and R is the group

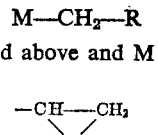

R₄ is as described above, i.e. compounds of the formula

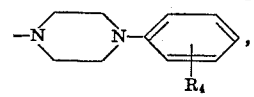

If wherein R₁' and R₄ are as described above may be prepared by reacting a compound of the formula

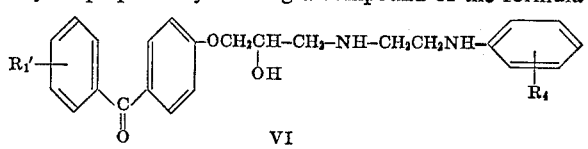

VI wherein R₁' and R₄ are as described above with a compound of the formula

R₅—CH₂—CH₂—R₅    VII wherein R₅ is as described above.

In a further process aspect of the present invention, compounds of Formula If above may be prepared by reacting a compound of the formula

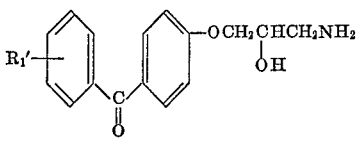

wherein $R_1'$ is as describe above with a compound of the formula

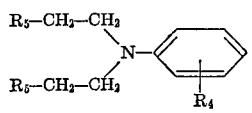

wherein $R_4$ and $R_5$ are as described above.

In another process aspect, compounds of Formula If above wherein $R_4$ is lower alkoxy may be prepared by introducing a lower alkoxy group by conventional means into a compound of the formula

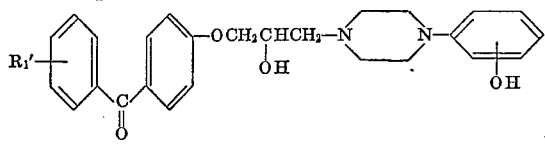

wherein $R_1'$ is as described above.

Compounds of the Formula I above wherein X or Y is carbonyl (or the intermediates utilized in the process of preparing same which contain a carbonyl group) can be converted into a ketal by treating the same with an alcohol such as a lower alkanol, e.g. methanol or a polyhydroxyalcohol such as ethylene glycol, in the presence of, for example, calcium chloride or a trace of acid according to techniques well established in the art. The term "ketal" is often used interchangeably by those skilled in the art with the term "acetal."

The product of the Formula I above, if it contains an unsaturated heterocyclic moiety, can be hydrogenated or if it contains a carbonyl group, can be ketalized or diketalized or reduced or converted to an oxime by reaction of a compound of Formula I, wherein Y is carbonyl with hydroxylamine hydrochloride. A compound containing a hydroxymethylene group can be oxidized or esterified by conventional procedures for effecting esterification. Furthermore, the products obtained from the preparative techniques described above can be converted into a quaternary ammonium compound with a quaternizing agent or into the acid addition salt thereof with pharmaceutically acceptable acids and/or split into the corresponding optical isomers.

Compounds of the Formula I above wherein the group R includes an unsaturated heterocyclic moiety, i.e. wherein in the Formula I above, $n$ is 1 or 2, can be hydrogenated to obtain the saturated derivatives thereof. For example, the compounds of the Formula I which contain such unsaturated heterocyclic moieties can be converted into the corresponding compounds which contain a saturated heterocyclic moiety by hydrogenating the former conventionally in the presence of a noble metal catalyst system such as palladium/charcoal, preferably, in a solvent medium such as methyl or ethyl alcohol whereby to obtain the desired compound, i.e. one in which the group R in Formula I above includes the piperidinyl or piperazinyl moiety.

As is evident from the above, the groups represented by the characters Y, Y', X', and X" can be converted one unto the other, if desired, by various procedures. For example, a compound of the Formula I above wherein X connotes a carbonyl group and Y a carbonyl or a methylene group, can be obtained by oxidizing the corresponding compound wherein X' or X" is hydroxy methylene and Y or Y' is a carbonyl or a methylene group with a mixture of dimethyl sulfoxide and acetic acid anhydride.

If Y or Y' connotes the carbonyl group compounds of the Formula I above wherein Y connotes a hydroxyiminomethylene group can be obtained via the reaction with hydroxylamine. Should X or X' be a carbonyl group, it would be necessary to first ketalize same in order to protect this carbonyl group from reacting with the hydroxylamine. The protecting ketal group, if desired, can be removed by hydrolysis after formation of the hydroxyiminomethylene group according to techniques well established in the art.

Reduction of a carbonyl group Y into the hydroxymethylene or methylene group can be carried out in the same manner as for the starting compounds of Formula II below.

Compounds of the Formula I above can be converted into the corresponding quaternary ammonium compounds by treating same with a quaternizing agent such as an alkali halide, e.g. methyl iodide. The treatment is advantageously effected utilizing an excess of the quaternizing agent in the absence of a solvent.

Compounds of Formula I above, form pharmaceutically acceptable acid addition salts with inorganic and organic acids, such as hydrohalic acids, e.g. hydrochloric acid and hydroiodic acid, with other mineral acids such as sulfuric acid, phosphoric acid, nitric acid or with organic acids such as tartaric acid, citric acid, oxalic acid, camphor sulfonic acid, ethane sulfonic acid, toluene sulfonic acid, mandelic acid, salicylic acid, ascorbic acid, maleic acid and the like. Among the many acid addition salts suitable for the purposes of the present invention, especially preferred is the hydrohalic acids, most preferentially, hydrochloric acid. The acid addition salts are advantageously prepared in a suitable solvent such as ethanol by treating the free base with the corresponding non-aqueous acid.

Compounds of the Formula II above which are useful as starting materials in the preparation of the compounds of the Formula I above can be prepared as follows:

A compound of the Formula II in which X' designates a hydroxymethylene group and Y a carbonyl group can be prepared via the reaction of a 4-alkoxybenzoyl halide with benzene or a substituted derivative thereof in the presence of an aprotic Lewis acid, such as for example, aluminum chloride, zinc chloride, boron trifluoride and the like (by Friedel-Crafts techniques). The so-formed compound is dealkylated to prepare a 4-hydroxy-benzophenone which is in turn reacted with an excess of an epihalohydrin, especially epichlorohydrin to thus prepare a corresponding compound of the Formula II above wherein X' designates a hydroxymethylene group, Y a carbonyl group and Z a

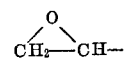

grouping. The reaction with an excess of an epihalohydrin is effected in the presence of a catalytic amount of any suitable organic base such as piperidine, at elevated temperatures, most preferably at about 100° C.

Also, the 4-hydroxy benzophenones, i.e. compounds of the Formula IV above wherein Y' is carbonyl, can additionally be prepared via the reaction of a 4-alkoxy benzoic acid with benzene, either substituted or unsubstituted, by condensing the two in the presence of polyphosphoric acid and dealkylating the compound so prepared.

4-hydroxy benzophenones in an advantageous process aspect of the present invention, can be prepared from the corresponding phenyl benzoate by Fries rearrangement in a manner well known in the art.

Compounds of the Formula II above in which X' and Y designate a hydroxymethylene group can be prepared by reducing selectively the correspondingly substituted 4-hydroxy benzophenone and joining same to the appropriately constituted side chain. Alternatively, a compound of the Formula II above wherein Y and X' are carbonyl can be reduced to effect the same end. The reduction in either case is effected with a metal hydride, for example, with a lower alkali metal borohydride, e.g. sodium borohydride or with an alkali metal aluminum hydride such as lithium aluminum hydride. Alternative compounds of the Formula II above in which X' and Y represent a hydroxymethylene group can be prepared by reacting the corresponding substituted benzaldehyde with a p-alkoxybenzene magnesium bromide (a Grignard reagent), to yield after dealkylation, the corresponding 4-hydroxy-benzhydrol and joining the appropriate side-chain thereto.

Compounds of the Formula II in which X' connotes a hydroxy-methylene group and Y designates a methylene group can be prepared by reacting the corresponding hydroxybenzophenone of the Formula IV above according to the Wolff-Kishner technique, i.e. after conversion to a semicarbazone or hydrazone, e.g. in the presence of an alkali alcoholate such as sodium methoxide at elevated temperatures. The same end can be effected via a Clemmensen rearrangement. For example, reducing in the presence of a catalyst, e.g. amalgamated zinc and hydrochloride acid, and thereafter, treating the so-obtained reduced product with epihalohydrin, preferably epichlorohydrin.

Compounds of the Formula II in which X' represents an hydroxymethylene group and Y a hydroxyiminomethylene group can be prepared by treating the corresponding compound of the Formula II above wherein Y is carbonyl with hydroxylamine hydrochloride.

Compounds of the Formula II wherein X' connotes a hydroxymethylene group and Y connotes a carbonyl group can be oxidized to compounds of the Formula II above whrein X' and Y are both carbonyl groups with conventional oxidizing agents, e.g. with potassium permanganate or sodium dichromate.

By oxidizing compounds of the Formula II above wherein X' represents a hydroxy methylene group and Y represents a methylene group, there can be obtained a compound of the Formula II in which X' connotes a carbonyl group and Y connotes a methylene group. The oxidation can be effected by any suitable oxidation system capable of effecting this end. Preferred for this purpose is a mixture of dimethylsulfoxide and acetic acid anhydride.

Compounds of the Formula II wherein $R_5$ represents halogen or alkyl sulfonyloxy (e.g. mesyloxy) or an aryl sulfonyloxy (e.g. tosyloxy) can be converted into compounds of the Formula II which contains the grouping

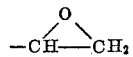

according to techniques well established in the art such as those described below in connection with compounds of the Formula V.

Compounds of the Formula III can be prepared in accordance with conventional procedures.

The reaction of a compound of the Formula II with a compound of the Formula III proceeds efficaciously at a temperature of from about room temperature to about the boiling point of the reaction medium. Most preferred is a temperature range of from about 70° to about 100° C. Suitably, the reaction is run in the presence of an inert organic solvent medium, for example, in dimethylsulfoxide, an alkanol such as methanol, ethanol, isopropanol and the like or a cyclic ether such as tetrahydrofuran and dioxane and the like.

Compounds of the Formula II in which $R_5$ represents halogen or alkylsulfonyloxy or arylsulfonyloxy (especially, respectively, mesyloxy or tosyloxy) is preferentially reacted with a compound of the Formula III in the presence of an acid acceptor. Among the many acid acceptors suitable for this purpose can be included pyridine and the like. A compound of the Formula II above in which Z connotes the group

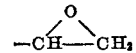

can be directly reacted with a compound of the Formula III above without the necessity of an acid acceptor being present to thereby obtain the corresponding compound of the Formula I above.

Techniques for preparing compounds of the Formula IV above are described hereinabove.

Compounds of the Formula V in which X'' connotes a hydroxymethylene group, can be prepared, for example, via the reaction of the base of the Formula III above with an epihalohydrin, most preferentially, with epichlorohydrin, in the presence of an aqueous alkanol such as ethanol, at elevated temperatures, whereby to prepare a compound of the Formula V in which $R_5$ is halogen. The resulting product, by treatment with strong aqueous alkali at room temperature, can be converted into compounds of the Formula V wherein M is

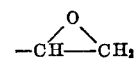

Compounds of the Formula V above in which $R_5$ connotes an alkylsulfonyloxy group or an aryl sulfonyloxy group, particularly, mesyloxy and tosyloxy, respectively, are similarly capable of being converted into a compound of the Formula V above wherein M is a

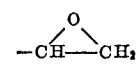

grouping.

Compounds of the Formula V above in which X'' designates a carbonyl group can be prepared from the corresponding compound of the Formula V above wherein X'' designates hydroxymethylene, by oxidizing the last-mentioned compound with a mixture of dimethyl sulfoxide and acetic anhydride whereby to convert the hydroxymethylene group into the desired carbonyl group. While temperature and pressure are not critical aspects of this process step, it is preferred to perform the oxidation at room temperature.

Compounds of the Formula V can be reacted with a compound of the Formula IV under the same reaction conditions as described above in connection with the reaction of a compound of the Formula II with a compound of the Formula III. If M in the Formula V above includes the grouping $R_5$—$CH_2$—X'', the compound of the Formula IV is preferably first converted to an alkali metal salt, for example a sodium or potassium salt (e.g. by treatment with an alkali metal hydroxide, such as sodium or potassium hydroxide or an alkali metal alcoholate such as sodium or potassium methylate) prior to the reaction with a compound of Formula V or the reaction of the compound of Formula IV with a compound of Formula V is carried out in the presence of a tertiary organic base, preferably, pyridine, a tri-lower alkyl amine such as triethylamine and the like.

The starting materials of Formula VI are obtained in a suitable manner by reaction of the respective 4-(2,3-epoxypropoxy)-4'-halobenzophenone with ethylenimine and subsequent reaction of the 4-(3-aziridinyl-2-hydroxypropoxy)-4'-halobenzophenone obtained with p-anisidine. Both reaction steps are preferably conducted in the presence of a lower alkanol (e.g. methanol) at a temperature between approximately 0° C. and 50° C. The last reaction step is carried out preferably in the presence of an acid such as, for example, maleic acid, a hydrohalic acid (e.g. hydrochloric acid), hydrotrifluoroboric acid or a borotrifluorideacetic acid complex.

The starting material of Formula VI can be obtained also by reaction of the respective 4-(2,3-epoxypropoxy)-4'-halobenzophenone with N-(2-aminoethyl)-p-methoxyaniline.

The reaction of the compounds of Formulas VI and VII is efficaciously performed in the presence of a polar organic solvent, such as a lower alkanol (e.g. methanol, ethanol) or in dimethylformamide, dimethylsulfoxide or tetrahydrofuran. A suitable reaction temperature is between approximately 50° C. and the boiling point of the reaction mixture. The reaction is performed in the presence of an acid-binding substance, e.g. in the presence of an alkali metal carbonate or hydroxide, for example potassium carbonate, sodium hydroxide and the like. 1,2-dichloro-1,2-dibromo or 1,2-ditosyloxy ethane are used as starting materials of Formula VII in preferred methods.

The starting materials of Formula VIII are prepared suitably from the respective 4-(2,3-epoxypropoxy)-4'-halobenzophenones. The latter can be rearranged into the respective N - {3 - [p-(p'-halobenzoyl)phenoxy]-2-hydroxypropyl}succinimides by reaction with succinimide, preferably in the presence of a lower alkanol (e.g. ethanol); the resulting compounds are converted to the 4-(3-amino-2-hydroxypropoxy)-4'-halobenzophenones of Formula VIII by subsequent hydrolysis. Acids (e.g. hydrochloric acid) as well as bases (e.g. soda lye) can be used for the hydrolysis.

The subsequent reaction of the compounds of Formulas VIII and IX is preferably performed in the presence of a polar organic solvent, such as a lower alkanol (e.g. methanol, ethanol), or also in dimethylformamide, dimethylsulfoxide or tetrahydrofuran. The temperature is suitably between approximately 50° C. and the boiling point of the reaction mixture. The reaction is efficaciously performed in the presence of an acid-binding substance, e.g. in the presence of an alkali metal carbonate or hydroxide, for example in the presence of potassium carbonate or sodium hydroxide. p - [Bis - (2 - chloroethyl)-amino]-anisol, p - [bis - (2-bromoethyl)-amino]anisol or p-[bis-(2-tosyloxyethyl)-amino]anisol are preferred as starting materials for Formula IX.

The starting materials for Formula X can be obtained e.g. by the reaction of 1-[p-hydroxyphenyl]piperazine with the respective 4-(2,3-epoxypropoxy)-4'-halobenzophenones. The reaction is carried out to advantage in the presence of a polar organic solvent, e.g. in the presence of a lower alkanol (e.g. ethanol) or in a cyclic ether such as dioxane.

The so-obtained starting materials of Formula X are then methylated. The methylation is performed following conventional techniques, e.g. by converting a compound of Formula X to an alkali metal salt, e.g. the sodium or potassium salt, and subsequent reaction with an alkylating agent such as dimethyl sulfate in an aqueous alkali solution. In an alternate method, the compound of Formula X is mixed with an alkali alkanolate solution, for example in a sodium methylate or potassium methylate solution, and the mixture is reacted subsequently with dimethyl sulfate or a compound of the formula $$CH_3T \qquad \qquad XI$$

wherein T is halogen, alkylsulfonyloxy or arylsulfonyloxy in the presence of an alkali metal hydride, preferably sodium hydride. Methyl bromide or methyl iodide are preferred as methylating substances. In a third method, a compound of Formula X is methylated with diazomethane. In this case, the compound of Formula X is dissolved preferably in a lower alaknol (e.g. methanol, ethanol), and the diazomethane is preferably dissolved in ether solution.

The methylation described above is performed at a low temperature. Temperatures between 0° C. and 40° C. are preferred.

The compounds of the Formula I, as is evident from the structural configuration thereof, occur in two optical isomeric forms. These can be separated according to conventional procedures. For example, the racemate can be resolved by treating the base with an optically active acid, e.g. with tartaric acid, bromocamphorsulfonic acid and the like. The resulting salts are separated through fractional crystallization into two fractions and the so-obtained fractions are split into their optical antipedes.

Thus, for example, the (+)-form of a compound of Formula If is obtained if, according to the invention, an optical (+)-antipode of a starting material of Formula II, V, VI, VIII or X is used. The obtained compound must be racemized. The racemization can be performed, after preceding protection of the keto group (by treating with N,N-dimethylhydrazine and subsequent quaternization of the N,N-dimethylhydrazone group with methyl iodide), by the oxidation of the hydroxy group of the side chain to the oxo group by means of dimethylsulfoxide and acetic anhydride and subsequent reduction of the obtained oxo group by means of an alkali metal borohydride followed by the cleavage of the quaternary N,N,N-trimethylhydrazone group with mild lye. Another method consists of the exchange of the hydroxy group of the side chain with chlorine with the use of thionyl chloride in chloroform. After treating with alkanolic sodium hydroxide solution, the introduced chlorine atom is again exchanged for a hydroxy group, and a product is formed that contains the (—)-antipode of a compound of Formula If.

If the racemate is obtained, separation can be carried out, for example, by the rearrangement of the base with an optically active acid, e.g. (+)- or (—)-tartaric acid or a derivative thereof, e.g. (+)- or (—)-O,O-dibenzoyltartaric acid, (+)- or (—)-α-bromocamphorsulfonic acid, etc. The mixture of the 2 optic isomers can be separated by repeated fractionated crystallization, and the (—)-antipode of a compound of Formula If desired, because of its high level of activity, is isolated.

The bases of Formula I are crystalline, solid substances, soluble in dimethylsulfoxide, dimethylformamide and in chlorinated hydrocarbons, such as chloroform and methylene chloride and relatively insoluble in water, methanol, ethanol, benzene and petroleum ether.

The acid addition salts of the bases of Formula I are also crystalline, solid substances. They are soluble in dimethylsulfoxide and dimethylformamide and relatively insoluble in water, methanol, ethanol, benzene, petroleum ether ad in chlorinated hydrocarbons such as chloroform and methylene chloride.

The compounds of the Formula I above, their ketals, quaternary ammonium compounds and acid addition salts are useful in view of their activity on the nervous system. Thus, they are useful as psycho-sedative agents, particularly in view of their capability of acting as reserpine-like hypotensive and sedative agents.

The narcosis potentiating activity of the compounds of Formula I on mice serves to demonstrate their psycho-sedative activity in warm blooded animals: Ethanol in a concentration of about 4 g./kg. body weight, injected intraperitoneally, results in an average duration of sleep (side posture) of less than one minute. In mice which have previously been treated with a psycho-sedative preparation, the duration of sleep is prolonged. The prolongation of the duration of sleep serves as a criterion for the psycho-sedative effect.

A compound of Formula I, as the test compound, was applied per os in the doses set out hereinafter to groups of 10 to 60 mice each (male animals, average weight 18–20 g.). After 15 minutes, ethanol in a dosage of 4 g./kg. body weight was administered intraperitoneally to all animals as well as to a control group of animals.

Results obtained utilizing the compounds of Formula I as the test compounds in the foregoing procedure are set forth hereinbelow in table I.

TABLE I

| Compound | Dosis, mg./kg. p.o. | Duration of sleep, minutes |
|---|---|---|
| 4-(benzoyl)phenoxy-CH₂-CHOH-CH₂-N(piperidinyl)-phenyl | 1, 2, 5, 10 | 42, 82, 159, >300 |
| 4-(benzoyl)phenoxy-CH₂-CHOH-CH₂-N(piperidinyl)-C₆H₄-Cl | 1, 3, 5, 10, 30 | 3, 35, 112, 217, >300 |
| 4-(benzoyl)phenoxy-CH₂-CHOH-CH₂-N(piperazinyl)-C₆H₄-Cl | 2.5, 5, 10, 20 | 25, 177, 242, >300 |
| 4-(4-fluorobenzoyl)phenoxy-CH₂-CHOH-CH₂-N(piperidinyl)-phenyl | 1, 1.5, 3 | 7, 15, 150 |
| 4-(4-chlorobenzoyl)phenoxy-CH₂-CHOH-CH₂-N(piperidinyl)-phenyl | 1, 1.5, 2, 3 | 23, 45, 72, 173 |
| 4-(4-fluorobenzoyl)phenoxy-CH₂-CHOH-CH₂-N(piperidinyl)-C₆H₄-F | 1, 2, 3, 5 | 46, 170, 258, >283 |
| 4-(4-fluorobenzoyl)phenoxy-CH₂-CHOH-CH₂-N(piperidinyl)-C₆H₄-Cl | 1, 1.5, 3 | 17, 40, 110 |
| 4-(4-fluorobenzoyl)phenoxy-CH₂-CHOH-CH₂-N(piperazinyl)-C₆H₄-Cl | 1, 1.5, 3 | 26, 133, 200 |
| 4-(4-chlorobenzoyl)phenoxy-CH₂-CHOH-CH₂-N(piperidinyl)-C₆H₄-F | 0.1, 0.25, 1, 2, 5 | 31, 42, 88, 163, >300 |
| 4-(4-bromobenzoyl)phenoxy-CH₂-CHOH-CH₂-N(piperidinyl)-C₆H₄-F | 1, 3 | 15, 130 |

The compounds of the Formula I, the acid addition salts thereof and the ketals can be administered in pharmaceutical dosage forms with the dosage adjusted to fit the exigencies of the therapeutic situation. The pharmaceutical dosage form may be prepared by incorporating the active ingredient in solid or liquid vehicles to provide dragees, capsules, elixirs, emulsions, powders and the like according to pharmaceutical practices. The carrier for the dosage form may be, for example, water, gelatin, gum arabic, lactose, starch, magnesium stearate, talc, vegetable oils, polyalkylene glycols, Vaseline and the like. The so-obtained dosage forms may be sterilized and/or may contain additives such as preserving, stabilizing, wetting and emulsifying agents. Other pharmaceutical adjuvants may be incorporated if necessary, such as salts for varying the osmotic pressure.

Convenient pharmaceutical dosage forms contain about 5 to 100 mg. of the compound of Formula I. Convenient oral dosages are in the range of about 0.1 mg. per kg. per day to about 10 mg./kg. per day. However, the aforementioned ranges are exemplary only and can be varied upwards or downwards depending upon the requirements of the warm blooded animal being treated and the directions of the physician.

The following examples are illustrative but not limitative of the present invention. All temperatures are stated in degrees centigrade.

In an analogous manner, there are obtained when employing:

4-[2,3-epoxy-propoxy] - 4' - methoxy-benzophenone and 4-phenyl-1,2,3,6-tetrahydro - pyridine; the compound 4-[3-(3,6 - dihydro-4-phenyl-1(2H)pyridyl)-2-hydroxypropoxy]-4'-methoxybenzophenone hydrochloride, M.P. 185–186°.

4-[2,3 - epoxy - propoxy] - 3' - methyl-benzophenone and 4-phenyl-1,2,3,6-tetrahydro - pyridine; the compound 4-[3-(3,6 - dihydro-4-phenyl-1(2H)pyridyl)-2-hydroxypropoxy]-3-methyl-benzophenone, M.P. 200–203°.

4-(2,3-epoxy-propoxy) - 4' - methyl - benzophenone and 4-phenyl - 1,2,3,6 - tetrahydro-pyridine; the compound 4-[3-(3,6 - dihydro-4-phenyl-1(2H)pyridyl)-2-hydroxypropoxy]-4'-methylbenzophenone hydrochloride, M.P. 209–210°.

4-[2,3-epoxy-propoxy]-benzophenone and 4-p-fluoro-phenyl-1,2,3,6-tetrahydropyridine; the compound 4-[3-(4-(p-fluoro - phenyl)-3,6-dihydro-1(2H)pyridyl)-2-hydroxypropoxy]-benzophenone hydrochloride, M.P. 160°.

4-(2,3-epoxy-propoxy)-4'-chlorobenzophenone and 4-p-chloro-phenyl-1,2,3,6-tetrahydropyridine; the compound 4[3-(4 - (p - chlorophenyl)-3,6-dihydro-1(2H)pyridyl)-2-hydroxy-propoxy]-4'-chlorobenzophenone hydrochloride, M.P. 212°.

4-(2,3-epoxy-propoxy)-4'-nitrobenzophenone and 4-phenyl-1,2,3,6-tetrahydropyridine; the compound 4-[3-(3,6-dihydro - 4 - phenyl-1(2H)-pyridyl) - 2 - hydroxy-propoxy]-4'-nitro-benzophenone hydrochloride, M.P. 201–203°.

4-(2,3-epoxy - propoxy) - 4' - bromobenzophenone and 4-phenyl-1,2,3,6-tetrahydro - pyridine; the compound 4-[3-(3,6 - dihydro-4-phenyl-1(2H)pyridyl)-2-hydroxypropoxy]-4'-bromobenzophenone hydrochloride, M.P. 210–212°.

4 - (2,3 - epoxy - propoxy) - 4'-fluorobenzophenone and 4-phenyl-1,2,3,6-tetrahydro-pyridine; the compound 4-[3-(3,6 - dihydro-4-phenyl-1(2H)pyridyl)-2-hydroxypropoxy]-4'-fluorobenzophenone hydrochloride, M.P. 198–200°.

4-(2,3-epoxy - propoxy)-4'-fluorobenzophenone and 4-p-fluoro-phenyl-1,2,36-tetrahydro-pyridine; the compound 4-[3-(4-(p-fluoro - phenyl)-3,6-dihydro-1(2H)pyridyl)-2-hydroxy-propoxy]-4'-fluorobenzophenone hydrochloride, M.P. 192–193°.

4-(2,3-epoxy-propoxy)-4'-chlorobenzophenone and 4-p-fluoro-phenyl-1,2,3,6-tetrahydropyridine; the compound 4-[3-(4-(p-fluoro - phenyl)-3,6-dihydro-1(2H)pyridyl)-2-hydroxy-propoxy]-4'-chlorobenzophenone hydrochloride, M.P. 203–204°.

4-[2,3 - epoxy - propoxy] - 4' - chlorobenzophenone and 4-phenyl-1,2,3,6-tetrahydro - pyridine; the compound 4-[3-(3,6-dihydro - 4 - phenyl-1(2H)pyridyl) - 2 - hydroxy-propoxy]-4'-chlorobenzophenone hydrochloride, M.P. 202°.

4-[2,3-epoxy-propoxy]-benzophenone and 4-p-chlorophenyl-1,2,3,6-tetrahydro-pyridine; the compound 4-[3-(4-(p-chlorophenyl) - 3,6 - dihydro-1(2H)pyridyl) - 2 - hydroxy - propoxy]-benzophenone hydrochloride, M.P. 217–218°.

4-(2,3-epoxy-propoxy)-4'-trifluoromethyl - benzophenone and 4-phenyl-1,2,3,6-tetrahydropyridine; the compound 4-[3-(3,6 - dihydro-4-phenyl-1(2H)pyridyl)-2-hydroxypropoxy] - 4' - trifluoromethylbenzophenone hydrochloride, M.P. 231°.

4-(2,3-epoxy - propoxy) - 3' - chlorobenzophenone and 4-phenyl-1,2,3,6-tetrahydro - pyridine; the compound 4-[3-(3,6-dihydro - 4-phenyl-1(2H)pyridyl)-2-hydroxypropoxy]-3'-chlorobenzophenone hydrochloride, M.P. 175°.

4-(2,3-epoxy-propoxy)-benzophenone and 4-phenyl-4-hydroxy-piperidine; the compound 4-[3-(4-hydroxy-4-phenyl-piperidino)-2-hydroxy - propoxy]benzophenone hydrochloride, M.P. 184°.

4-(2,3-epoxy-propoxy)-3'-trifluoromethyl - benzophenone and 4-p-chlorophenyl-1,2,3,6 - tetrahydropyridine; the compound 4-[3-(3,6-dihydro - 4-phenyl-1(2H)pyridyl)-2-hydroxy-propoxy]-3'-trifluoromethyl - benzophenone hydrochloride, M.P. 130–134°.

4-(2,3-epoxy-propoxy)-4'-fluorobenzophenone and 4-p-chlorophenyl-1,2,3,6-tetrahydropyridine; the compound 4-[3-(4-(p-chlorophenyl)-3,6 - dihydro-1(2H)pyridyl)-2-hydroxy-propoxy]-4'-fluorobenzophenone hydrochloride, M.P. 204–206°.

4-(2,3-epoxy-propoxy)-4'-bromobenzophenone and 4-p-fluorophenyl-1,2,3,6-tetrahydropyridine; the compound 4-[3-(4-(p-fluorophenyl)-3,6-dihydro - 1(2H)pyridyl)-2-hydroxypropoxy]-4-bromobenzophenone hydrochloride, M.P. 233°.

4-(2,3-epoxy-propoxy)-4'-bromobenzophenone and 4-(p-chlorophenyl) - 1,2,3,6 - tetrahydropyridine; the compound 4-[3-(4-(p-chlorophenyl)-3,6-dihydro - 1(2H) pyridyl)-2-hydroxypropoxy]-4' - bromobenzophenone hydrochloride, M.P. 217°.

4-(2,3-epoxy-propoxy)-diphenyl-methane and 4 - phenyl-1,2,3,6-tetrahydropyridine; the compound α - [(p-benzyl-phenyloxy)-methyl]-3,6-dihydro-4-phenyl - 1(2H) pyridine ethanol hydrochloride, M.P. 191°.

The 4-[2,3-epoxy-propoxy]-3-methyl - benzophenone can, for example, be manufactured as follows:

10.6 g. of 4-hydroxy-3-methyl-benzophenone, 50 g. of epichlorohydrin and 3 drops of piperidine are heated on the steam bath for 12 hours. The reaction solution is freed from excess epichlorohydrin under reduced pressure. The above residue is dissolved in 20 ml. of chloroform and, after addition of 20 ml. of 3 N caustic soda, shaken at room temperature for 1 hour. The organic phase is separated, washed with water, dried over calcium chloride and evaporated to dryness. The residual oily crude 4-[2,3-epoxy-proxy]-3-methyl - benzophenone crystallizes after long standing. The compound can be further processed without further purification. The compound, recrystallized from aqueous ethyl alcohol, melts at 56–58°. The 4-[2,3-epoxy-propoxy]-4'-methoxy-benzophenone manufactured in an analogous manner from 4-hydroxy-4'-methoxy - benzophenone melts at 123–124°. The ether 4-[2,3-epoxy-propoxy]-benzophenones identified above can be prepared similarly.

Example 1

5.1 g. of 4-[2,3-epoxy-propoxy]-benzophenone are dissolved in 20 ml. of dioxan and, after addition of 3.9 g. of 1-o-methoxy-phenyl - piperazine, heated under reflux conditions for 5 hours. The solvent in subsequently evaporated off under reduced pressure. The residue is dissolved in 10 ml. of ethanol and made congo-acid with ethanolic hydrochloric acid. The 4-[3-(4-(o - methoxy-phenyl)-piperazino)-2-hydroxy propoxy] - benzophenone hydrochloride crystallizing out on trituration melts at 210–211° after recrystallization from ethanol.

In an analogous manner, there are obtained when employing:

4-[2,3-epoxy-propoxy]-benzophenone and 1-(p - chlorophenyl-piperazine; the compound 4-[3-(4-(p - chlorophenyl)-1-piperazinyl)-2-hydroxy - propoxy] - benzophenone hydrochloride, M.P. 175°.

4-[2,3-epoxy-propoxy]-benzophenone and 1-(p-methoxyphenyl)-piperazine; the compound 4-[3-(4 - (p - methoxy-phenyl)-1-piperazinyl)-2 - hydroxy - propoxy]-benzophenone hydrochloride, M.P. 145°.

4-(2,3-epoxy-propoxy)-benzophenone and 1-m-methoxyphenyl-piperazine; the compound 4-[3-(4-(m-methoxyphenyl)-1-piperazinyl)-2-hydroxy - propoxy] - benzophenone dihydrochloride, M.P. 193–196°.

4-(2,3-epoxy-propoxy)-4'-chlorobenzophenone and 1-o-methoxy-phenyl-piperazine; the compound 4-[3-(4-(o-methoxy-phenyl)-1-piperazinyl)-2-hydroxy - propoxy]-4'-chlorobenzophenone hydrochloride M.P. 201°.

4-(2,3-epoxy-propoxy)-4' - fluorobenzophenone and 1-p-chlorophenyl-piperazine; the compound 4-[3-(4 - (p-chlorophenyl)-1-piperazinyl)-2-hydroxy-propoxy] - 4'-fluorobenzophenone dihydrochloride, M.P. 191–193°.

4-[2,3-epoxy-propoxy] - benzophenone and N - phenyl-piperazine; the compound 4-[2-hydroxy-3-(4-phenyl-1-piperazinyl)-propoxy] - benzophenone hydrochloride, M.P. 210–211°.

4-(2,3-epoxy-propoxy)-benzophenone and 4-(o - chlorophenyl)-piperazine; the compound 4-[3-(4-(o-chlorophenyl)-1-piperazinyl)-2-hydroxy - propoxy] - benzophenone hydrochloride, M.P. 179–180°.

4-[2,3-epoxy-propoxy]-benzophenone and 1 - p - tolyl-piperazine; the compound 4-[3-(4-p-tolyl - 1 - piperazinyl)-2-hydroxy-propoxy]-benzophenone, M.P. 128°.

Example 2

2.25 g. of 4-[3-(3,6-dihydro-4-phenyl-1(2H)pyridyl)-2-hydroxy-propoxy] - benzophenone hydrochloride was suspended in 50 ml. of methanol. To the so-formed suspension, there was added with stirring a solution of 1.0 gram of sodium borohydrate in 20 ml. of alcohol (adjusted to about pH 9). The so-formed solution was left at room temperature for 30 minutes with stirring and after washing with sodium chloride, filtrating and drying, it was evaporated under reduced pressure. Upon recrystallization of the residue from methanol, 4-[3-(3,6-dihydro-4-phenyl-1(2H)pyridyl)-2-hydroxy - propoxy]-benzhydrol of melting point 94° was obtained.

Example 3

4-[3-(4-(o-methoxyphenyl) - 1 - piperazinyl) - 2-hydroxy-propoxy]-benzophenone hydrochloride was treated in a manner described in the above example whereby to obtain 4-[3-(4-(o-methoxy-phenyl) - 1 - piperazinyl)-2-hydroxy-propoxy]-benzhydrol hydrochloride of melting point 173°.

Example 4

4.5 g. of 4-[3-(3,6-dihydro-4-phenyl-1(2H)pyridyl)-2-hydroxy-propoxy]-benzophenone were suspended in 400 ml. of benzene and treated under refluxing conditions. A stream of gaseous hydrochloric acid was conducted through the suspension for one hour. Afterwards 6.2 g. of distilled ethylene glycol and 3.44 g. of p-toluene sulphonic acid were added. The resulting clear solution was dissolved in acetic ether. The solution was washed three times with 1 N sodium hydroxide, dried over sodium sulfate and evaporated under reduced pressure. The 3,6-dihydro-4-phenyl-α-[(p-(2-phenyl-1,3-dioxolane - 2 - yl)-phenyloxy)-methyl] - 1(2H)pyridine ethanol melted at 120° C. after recrystallization from methanol.

In an analogous manner there were obtained when employing:

4-[4-(3,6-dihydro - 4 - phenyl-1(2H)pyridyl)-2-hydroxy-propoxy]-benzophenone and 1,3-propanediol; the compound 3,6-dihydro - 4 - phenyl-α-[(p-(2-phenyl-m-dioxane-2-yl)- phenyloxy)-methyl]-1(2H)pyridine ethanol, M.P. 116.5° C.

Example 5

27.2 g. of 4-(2,3-epoxypropoxy)-4'-fluorobenzophenone and 19.2 g. 1-(p-methoxyphenyl)piperazine are refluxed for 1 hour with 500 ml. ethanol. After cooling, the separated crystals are filtered and washed with a small volume of ether. 4-{3-[4-(p-methoxyphenyl)-1-piperazinyl]-2-hydroxypropoxy}-4'-fluorobenzophenone is obtained; it melts at 149–150° C. after crystallization from acetonitrile.

The starting material 4-(2,3-epoxypropoxy)-4'-fluorobenzophenone can be prepared in the following manner.

23 g. of 4-methoxy-4'-fluorobenzophenone are added with agitation to a hot mixture of 30 ml. glacial acetic acid and 60 ml. 65 percent hydrobromic acid and refluxed with continued agitation. The hot solution is poured into approximately 200 ml. water; a precipitate is formed. The mixture is filtered after cooling. The residue is washed neutral with water and dissolved in an excess of warm 3 N soda lye. The solution is extracted with chloroform. The aqueous phase is acidified with concentrated hydrochloric acid. The separate crude product is filtered, washed neutral with water and crystallized from a mixture of water and ethanol (1:3). The 4-hydroxy-4'-fluorobenzophenone is obtained in crystals that melt at 170–172° C.

21.6 g. of 4-hydroxy-4'-fluorobenzophenone, 40 ml. epichlorohydrin and 0.3 ml. piperidine are stirred for 12 hours at 100° C. The excess epichlorohydrin is evaporated under reduced pressure at 80° C. The residue is dissolved in approximately 50 ml. chloroform and shaken for 1 hour with a solution of 4 g. sodium hydroxide in 10 ml. water. The aqueous phase is separated, the organic phase is washed neutral with water, dried over potassium carbonate and evaporated. 4-(2,3-epoxypropoxy)-4'-fluorobenzophenone crystals are obtained after crystallization from methanol; they melt at 105–106° C.

Example 6

Rac. 4-{3-[4-(p-methoxyphenyl)-1-piperizinyl] - 2 - hydroxypropoxy}-4'-chlorobenzophenone is obtained in the manner described in Example 5 from 4-(2,3-epoxypropoxy)-4'-chlorobenzophenone and 1-(p-methoxyphenyl)piperazine. It melts at 150–151° C. after recrystallization from ethanol.

The starting material 4-(2,3-epoxypropoxy)-4'-chlorobenzophenone can be prepared in a manner similar to that of Example 4. The melting point is 116–117° C. (from ethanol).

Example 7

1 g. of 4-hydroxy-4'-fluorobenzophenone is added to a solution of 120 mg. sodium in 20 ml. absolute ethanol. A solution of 1.4 g. rac. 1-(2-hydroxy-3-chloropropyl)-4-(p-methoxyphenyl)piperazine in 10 ml. absolute ethanol is added to the above solution. The obtained mixture is refluxed for 1.5 hours. Rac. 4-{3-[4-(p-methoxyphenyl)-1 - piperazinyl] - 2 - hydroxypropoxy}-4'-fluorobenzophenone is obtained in crystalline form after cooling. The crystals obtained by crystallization from acetonitrile melt at 149–150° C.

The starting material rac. 1-(2-hydroxy-3-chloropropyl)-4-(p-methoxyphenyl)piperazine can be prepared as follows: 3.8 g. of 1-(p-methoxyphenyl)piperazine are dissolved in 20 ml. methanol and reacted with 2 g. epichlorohydrin. The reaction mixture is allowed to stand for 24 hours at room temperature; the crude product separates out in crystalline form during this period. Pure rac. 1-(2-hydroxy-3-chloropropyl)-4-(p - methoxyphenyl)piperazine is obtained after filtering and crystallization from ethanol; it melts at 111 to 111.5° C.

Example 8

Using 4-hydroxy-4'-chlorobenzophenone and rac. 1-(2-hydroxy-3-chloropropyl)-4-(para - methoxyphenyl)piperazine in the manner described in Example 7, rac. 4-{3-[4-(p-methoxyphenyl)-1-piperazinyl] - 2 - hydroxypropoxy}-4'-chlorobenzophenone is obtained; it melts at 150–151° C. after crystallization from ethanol.

Example 9

0.5 g. of rac. 4-{3-[(2-p-anisidinoethyl)amino]-2-hydroxypropoxy}-4'-fluorobenzophenone and 0.2 g. 1,2-dibromoethane are heated for 24 hours on the steam bath. After cooling, the reaction mixture is mixed with ether and freed from insoluble components by filtration. After evaporation of the ether, the residue is mixed with chloroform and 3 N ammonia solution. The organic phase is dried over potash and the solvent is evaporated under reduced pressure. The residue is chromatographed on silica gel with absolute ether as the solvent. The obtained pure rac. 4-{3-[4-(p-methoxyphenyl) - 1 - piperazinyl]-2-hydroxypropoxy}-4'-fluorobenzophenone melts at 142° C.

The starting material rac. 4-{3-[(2-p-anisidinoethyl)amino]-2-hydroxypropoxy}-4'-fluorobenzophenone can be prepared as follows: 8.1 g. of 4-(2,3-epoxypropoxy)-4'-fluorobenzophenone and 30 g. ethylene imine are allowed to stand for 24 hours at room temperature in 200 ml. methanol. The excess ethylene imine and the solvent are evaporated under reduced pressure and the residue is crystallized from ethylacetate and petroleum ether. The obtained rac. 4-[3-(1-aziridinyl)-2-hydroxypropoxy]-4'-fluorobenzophenone melts after a second crystallization at 117–118° C.

2.6 g. of rac. 4-[3-(1-aziridinyl)-2-hydroxypropoxy]-4'-fluorobenzophenone, 1.1 g. p-anisidine and 2.5 g. maleic acid are allowed to stand in 18 ml. methanol for 4 days at room temperature; crude rac. 4-{3-[(2-p-anisidinoethyl)amino] - 2 - hydroxypropoxy}-4'-fluorobenzophenone maleinate crystallizes out. The crystallization is completed by keeping in the refrigerator. After crystallization from ethanol, the product melts at 165–167° C.

Example 10

1.6 g. of rac. 4-(3-amino-2-hydroxypropoxy)-4'-fluorobenzophenone HCl, 1.7 g. bis-N,N-(2-bromoethyl)-p-anisidine and 0.6 g. sodium hydroxide are refluxed for 24 hours in 30 ml. n-butanol and filtered while hot. The rac. 4-{3-[4-(p-methoxyphenyl)-1-piperazinyl] - 2 - hydroxypropoxy} - 4' - fluorobenzophenone, crystallizing on cooling and after rubbing, melts at 147° C. after crystallization from methanol.

The starting material rac. 4-(3-amino - 2 - hydroxypropoxy)-4'-fluorobenzophenone HCl can be prepared as follows: 2.7 g. of 4-(2,3-epoxypropoxy)-4'-fluorobenzophenone and 1.0 g. succinimide are refluxed for 5 hours in 20 ml. ethanol. The N-{3-[p-(p-fluorobenzoyl)-phenoxy]-2 - hydroxypropyl}succinimide crystallizing on cooling melts at 155–157° C. after recrystallization from ethanol.

13.6 g. of N-{3-[p-(p-fluorobenzoyl)-phenoxy]-2-hydroxypropyl}succinimide are refluxed with 100 ml. concentrated hydrochloric acid for 16 hours. After evaporation of the excess hydrochloric acid under reduced pressure, the residue is made alkaline with 1 N soda lye. The crude base is filtered, dissolved in methanol and converted to the corresponding hydrochloride by the addition of methanolic hydrochloric acid. The rac. 4-(3-amino-2-hydroxypropoxy) - 4'-fluorobenzophenone HCl obtained in this manner melts at 250–251° C. after crystallization from methanol.

Example 11

0.5 g. of rac. 4-{3-[4-(p-hydroxyphenyl)-1-piperazinyl]-2-hydroxypropoxy}-4'-fluorobenzophenone are dissolved in 100 ml. methanol and mixed with excess solution of diazomethane in ether. The solution is allowed to stand at room temperature for 12 hours and is evaporated under reduced pressure until crystallization begins. The obtained rac. 4-{3-[4-(p-methoxyphenyl)-1-piperazinyl]-2-hydroxypropoxy} - 4'-fluorobenzophenone melts, after crystallization from methanol, at 144–146° C.

The starting material rac. 4-{3-[4-(p-hydroxyphenyl)-1-piperazinyl]-2-hydroxypropoxy} - 4' - fluorobenzophenone can be prepared as follows: 5.5 g. of 4-(2,3-epoxypropoxy)-4'-fluorobenzophenone and 3.6 g. 1-(p-hydroxyphenyl)piperazine are refluxed for 1 hour in 40 ml. ethanol. The solvent is evaporated under reduced pressure, the oily residue is acidified with ethanolic hydrochloric acid and crystallized with ethylacetate. The obtained rac. 4-{3-[4-(p-hydroxyphenyl) - 1 - piperazinyl]-2-hydroxypropoxy}-4'-fluorobenzophenone melts, after recrystallization from water at 184–186° C.

Example 12

A hot solution of 3.9 g. rac. 4-{3-[4-(p-methoxyphenyl)-1-piperazinyl] - 2 - hydroxypropoxy}-4'-fluorobenzophenone and 3.1 g. (+)-O,O-dibenzoyl tartaric acid in 350 ml. methanol is allowed to cool slowly to room temperature. The separating salt of (—)-4-{3-[4-(p-methoxyphenyl)-1-piperazinyl] - 2 - hydroxypropoxy}-4'-fluorobenzophenone with (+)-O,O-dibenzoyl tartaric acid is filtered off with suction and crystallized from methanol. Melting point 178–180° C. (decomposition). $[\alpha]_D^{20} = +51.6°$ (in dioxan, c.=1).

Example 13

Capsule dosage forms containing the following contents:

| | Mg. |
|---|---|
| 4-[3-(3,6-Dihydro - 4 - phenyl-1(2H)-pyridyl)-2-hydroxy-propoxy]-benzophenone hydrochloride | 10 |
| Mannitol | 110 |
| Talcum | 5 |
| | 125 | were prepared as follows:

4 - [3-(3,6-dihydro - 4 - phenyl-1(2H)-pyridyl)-2-hydroxy-propoxy]-benzophenone hydrochloride is homogeneously mixed with the talcum and mannitol, passed through a No. 5 sieve (mesh width about 0.23 mm.) and again thoroughly mixed. The mixture obtained is filled into gelatin capsules No. 4.

Example 14

Dragée dosage forms containing the following ingredients:

| | Mg. |
|---|---|
| 4-[3-(4-o-methoxy - phenyl)-piperazino)-2-hydroxy-propoxy]-benzophenone hydrochloride | 25 |
| Mannitol | 100 |
| Maize starch | 0 |
| Talcum | 5 |
| | 150 | were manufactured as follows:

The active material is mixed with mannitol and passed through a No. 5 sieve (mesh width about 0.23 mm.). A 10% aqueous paste is prepared from the maize starch and homogeneously mixed with the mannitol/active material mixture. The slightly moist mass is passed through a No. 3 sieve (mesh width about 1.0 mm.). The granulate obtained is dried and, after addition of the talcum, pressed to biconvex kernels having a weight of 150 mg. The kernels can be covered with a sugar layer in accordance with usual coating techniques.

We claim:

1. A compound of the formula

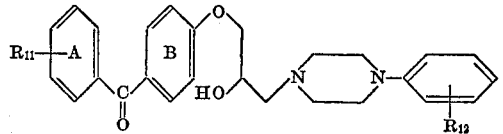

wherein $R_{11}$ is hydrogen or halogen and
$R_{12}$ is hydrogen, halogen, lower alkyl having from 1 to 7 carbon atoms or lower alkoxy the pharmaceutically acceptable acid addition salts thereof, the ketals thereof and optical isomers thereof.

2. A compound of claim 1 wherein $R_{11}$ is hydrogen and $R_{12}$ is halogen and is joined to the phenyl moiety to which it is attached in position-4, i.e. 4-{3-[4-(p-halophenyl)-1-piperazinyl]-2-hydroxy-propoxy}-benzophenone.

3. The compound of claim 2 wherein $R_{12}$ is chlorine, i.e. 4-{3-[4-(p - chlorophenyl)-1-piperazinyl]-2-hydroxy-propoxy}-benzophenone.

4. A compound of claim 1 wherein $R_{11}$ is halogen and is joined to the A ring of the benzophenone nucleus of position-4 and $R_{12}$ is halogen and is joined to the phenyl moiety to which it is attached in position-4, i.e. 4-{3-[4-(p-halophenyl)-1-piperazinyl] - 2 - hydroxy-propoxy}-4'-halobenzophenone.

5. A compound as defined in claim 4 wherein $R_{11}$ is fluorine and $R_{12}$ is chlorine, i.e. 4-{3-[4-(p-chlorophenyl)-1-piperazinyl] - 2 - hydroxy-propoxy}-4'-fluorobenzophenone.

6. A compound as defined in claim 1 wherein $R_{11}$ is fluorine and is joined to the A-ring of the benzophenone nucleus at the 4-position and $R_{12}$ is methoxy and is joined to the phenyl ring to which it is attached at position-4, i.e. 4-fluoro-4'-[2-hydroxy - 3 - (4-(p-methoxyphenyl)-1-piperazinyl)-propoxy]-benzophenone.

7. A compound as defined in claim 1 wherein $R_{11}$ is chlorine and is joined to the A-ring of the benzophenone nucleus at the 4-position and $R_{12}$ is methoxy and is joined to the phenyl ring to which it is attached at position-4, i.e. 4-chloro-4'-[2-hydroxy-3-(4 - (p - methoxyphenyl)-1-piperazinyl)propoxy]-benzophenone.

8. (—)-4-{3-[4-(p - methoxy - phenyl)-1-piperazinyl]-2-hydroxypropoxy}-4'-fluoro-benzophenone.

References Cited
UNITED STATES PATENTS

| | | | |
|---|---|---|---|
| 3,277,094 | 10/1966 | Werner | 260—268 PH |
| 3,701,777 | 10/1972 | Edenhofer | 260—268 PH |
| 3,706,755 | 12/1972 | Edenhofer | 260—268 PH |
| 3,426,036 | 2/1969 | Biel | 260—268 PH |
| 2,575,122 | 11/1951 | Pollard | 260—268 PH |

DONALD G. DAUS, Primary Examiner

U.S. Cl. X.R.

424—250